US007116997B2

(12) United States Patent
Byers et al.

(10) Patent No.: US 7,116,997 B2
(45) Date of Patent: *Oct. 3, 2006

(54) METHOD AND APPARATUS FOR NETWORK-ASSISTED AUTOMATIC CONFIRMATION OF SHORT MESSAGE SERVICE DELIVERY

(75) Inventors: Simon D. Byers, Summit, NJ (US); Nathan Hamilton, Irvine, CA (US); Shanmugavelayutham Muthukrishnan, Washington, DC (US); James F. Parkyn, Pasadena, CA (US)

(73) Assignees: Cingular Wireless II, LLC, Atlanta, GA (US); AT&T Corp, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/190,113

(22) Filed: Jul. 25, 2005

(65) Prior Publication Data

US 2005/0255869 A1 Nov. 17, 2005

Related U.S. Application Data

(63) Continuation of application No. 10/011,554, filed on Nov. 6, 2001, now Pat. No. 6,928,290.

(60) Provisional application No. 60/325,788, filed on Aug. 22, 2001.

(51) Int. Cl.
*H04Q 7/20* (2006.01)

(52) U.S. Cl. ...................... 455/466; 455/445; 455/458; 455/433; 709/203

(58) Field of Classification Search ................ 455/466, 455/424, 428, 445, 418, 458, 461, 412.1, 455/414.1; 370/352, 331, 337; 709/203, 709/206, 245

See application file for complete search history.

(56) References Cited

U.S. PATENT DOCUMENTS

| 4,644,351 A | 2/1987 | Zabarsky et al. |
| 5,224,150 A | 6/1993 | Neustein |
| 5,519,718 A | 5/1996 | Yokev et al. |
| 5,526,401 A | 6/1996 | Roach, Jr. et al. |

(Continued)

FOREIGN PATENT DOCUMENTS

WO    WO 98/23112    5/1998

(Continued)

OTHER PUBLICATIONS

TIA/EIA Standard, TDMA Third Generation Wireless, "R-DATA/SMDPP Transport," ANSI/TIA/EIA-136-610.

(Continued)

*Primary Examiner*—Joseph Feild
*Assistant Examiner*—Kamaran Afshar
(74) *Attorney, Agent, or Firm*—Klarquist Sparkman, LLP

(57) ABSTRACT

In a mobile communications network, a delivery acknowledgement receipt can be sent to indicate a SMS message is delivered. A system can be based on currently-existing protocols, such as described in the IS-136 standard. Existing network signals that acknowledge receipt of a message can be captured and utilized to notify the originator when the SMS message is delivered. A variety of other scenarios (e.g., unsuccessful delivery) can also be supported.

20 Claims, 5 Drawing Sheets

U.S. PATENT DOCUMENTS

| | | | |
|---|---|---|---|
| 5,678,179 A | 10/1997 | Turcotte et al. | |
| 5,682,460 A * | 10/1997 | Hyziak et al. | 709/217 |
| 5,692,032 A | 11/1997 | Seppanen et al. | |
| 5,748,100 A | 5/1998 | Gutman et al. | |
| 5,832,220 A * | 11/1998 | Johnson et al. | 709/206 |
| 5,878,351 A | 3/1999 | Alanara et al. | |
| 5,915,222 A * | 6/1999 | Olsson et al. | 455/466 |
| 5,930,239 A | 7/1999 | Turcotte | |
| 5,940,740 A | 8/1999 | Aas et al. | |
| 6,097,962 A | 8/2000 | Corriveau et al. | |
| 6,151,507 A | 11/2000 | Laiho et al. | |
| 6,208,870 B1 | 3/2001 | Lorello et al. | |
| 6,223,045 B1 | 4/2001 | Valentine et al. | |
| 6,230,019 B1 | 5/2001 | Lee | |
| 6,370,390 B1 | 4/2002 | Salin et al. | |
| 6,424,841 B1 | 7/2002 | Gustafsson | |
| 6,606,309 B1 * | 8/2003 | Wang | 455/466 |
| 6,718,178 B1 | 4/2004 | Sladek et al. | |
| 6,928,290 B1 * | 8/2005 | Byers et al. | 455/455 |
| 2001/0011020 A1 | 8/2001 | Nahm | |
| 2001/0016845 A1 | 8/2001 | Tribbensee | |
| 2002/0090963 A1 | 7/2002 | Avalos et al. | |

FOREIGN PATENT DOCUMENTS

| | | |
|---|---|---|
| WO | WO 99/39524 | 8/1999 |

OTHER PUBLICATIONS

TIA/EIA Standard, TDMA Third Generation Wireless, "Short Message Service—Cellular Message Teleservice," ANSI/TIA/EIA-136-710-B.

Bruno, "Carriers show mixed reactions to ReFLEX 25 delay," *RCR-Radio Communications Report*, vol. 18, Issue 32, Aug. 9, 1999.

"First Motorola ReFLEX Two-Way Paging System is Operational," http://www.motorola.com/General/Events/TELECOM/95/Press/PR951001_44416.html, pp. 1-2, May 6, 2002.

Bayer, "E-Mail Anywhere; There's been a lot of hype about wireless e-mail on handheld devices. We check out whether it's worthwhile and how well it works and look at some of the surprising things you can do," *Computerworld*, p. 79, Jun. 19, 2000.

Marti, *Active Messenger: Email Filtering and Mobile Delivery*, Version 1.1, pp. 1-122, Sep. 1999.

*Page Writer™ 2000 User's Manual*, Motorola, Inc., pp. 1-86, 1998.

* cited by examiner

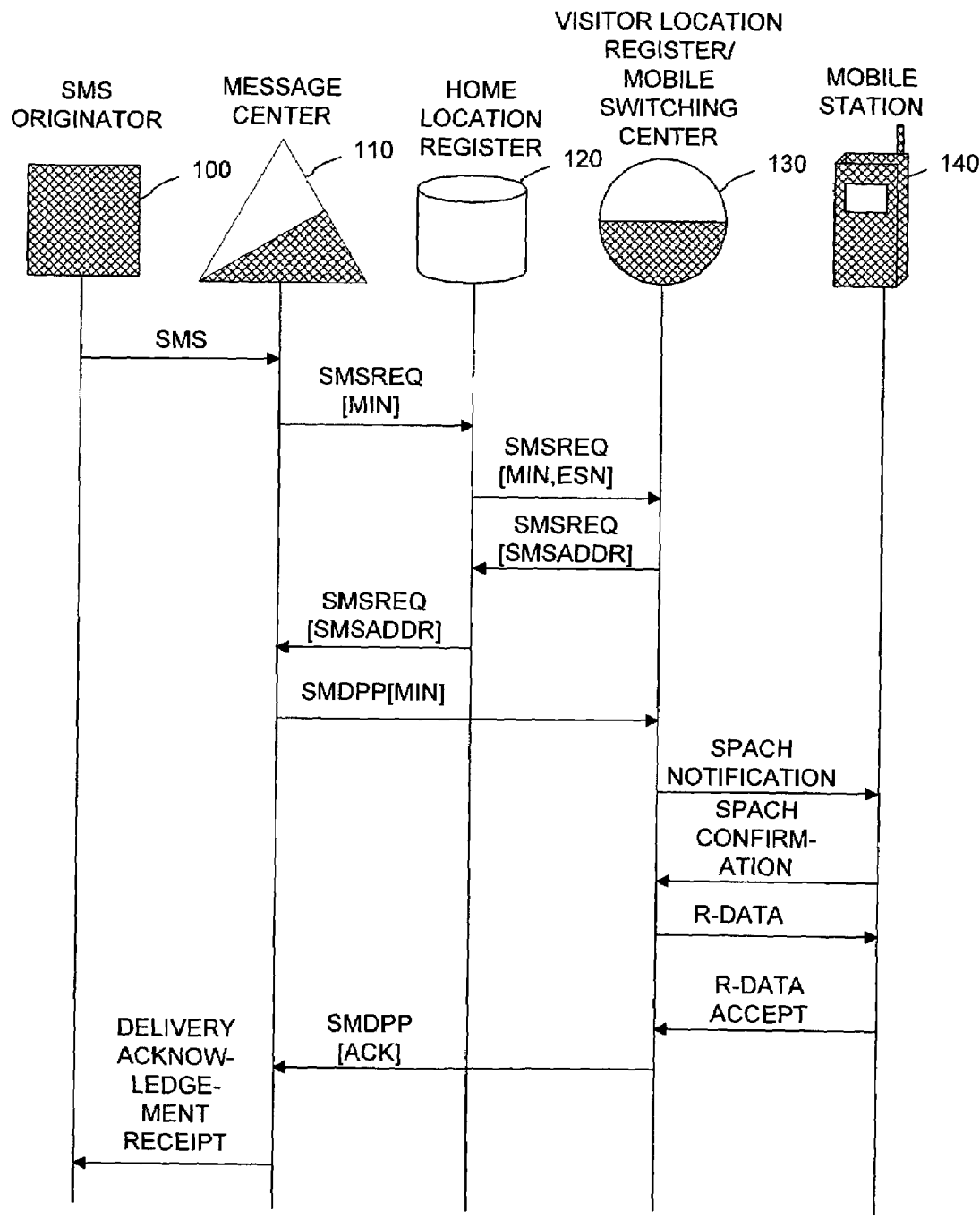

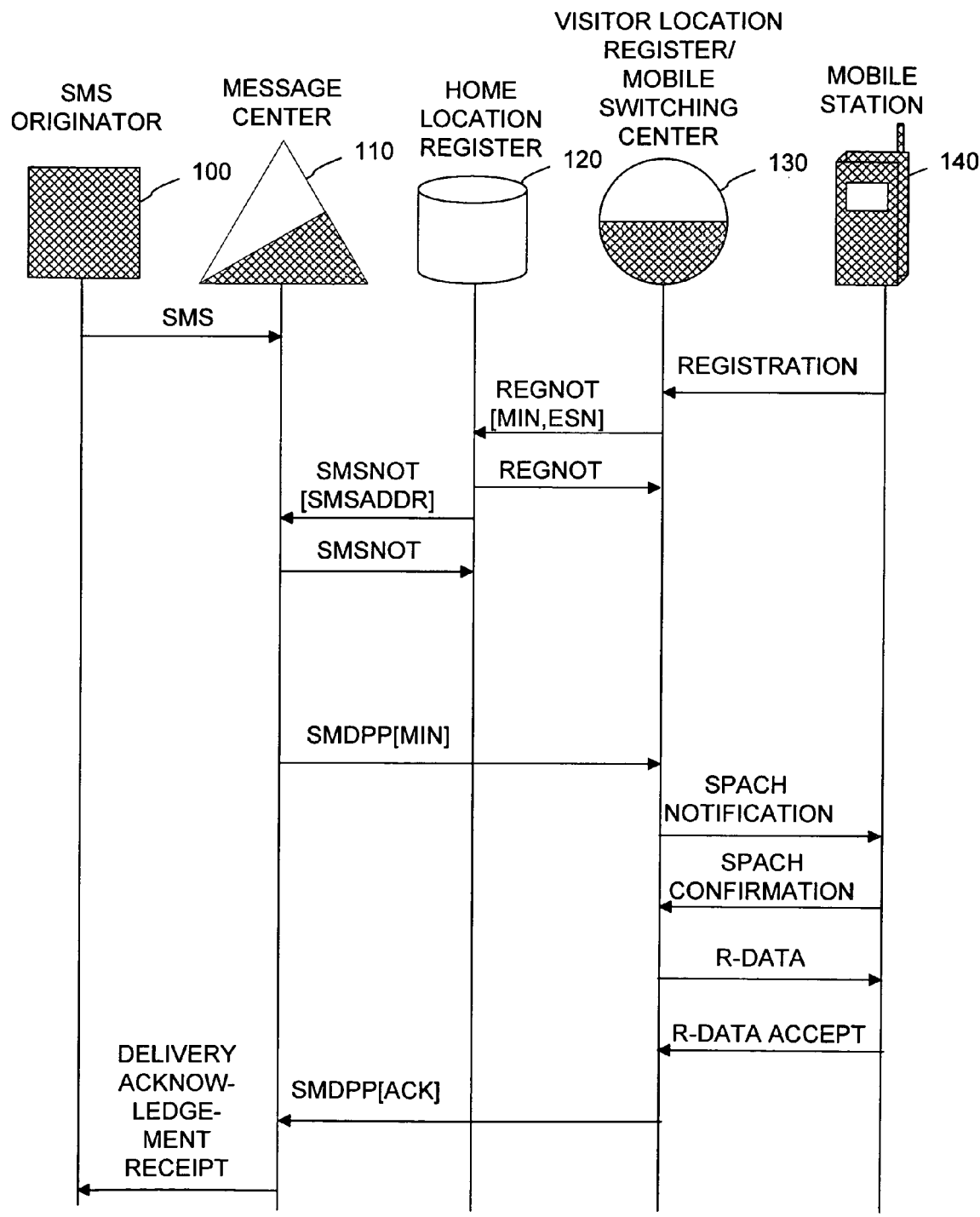

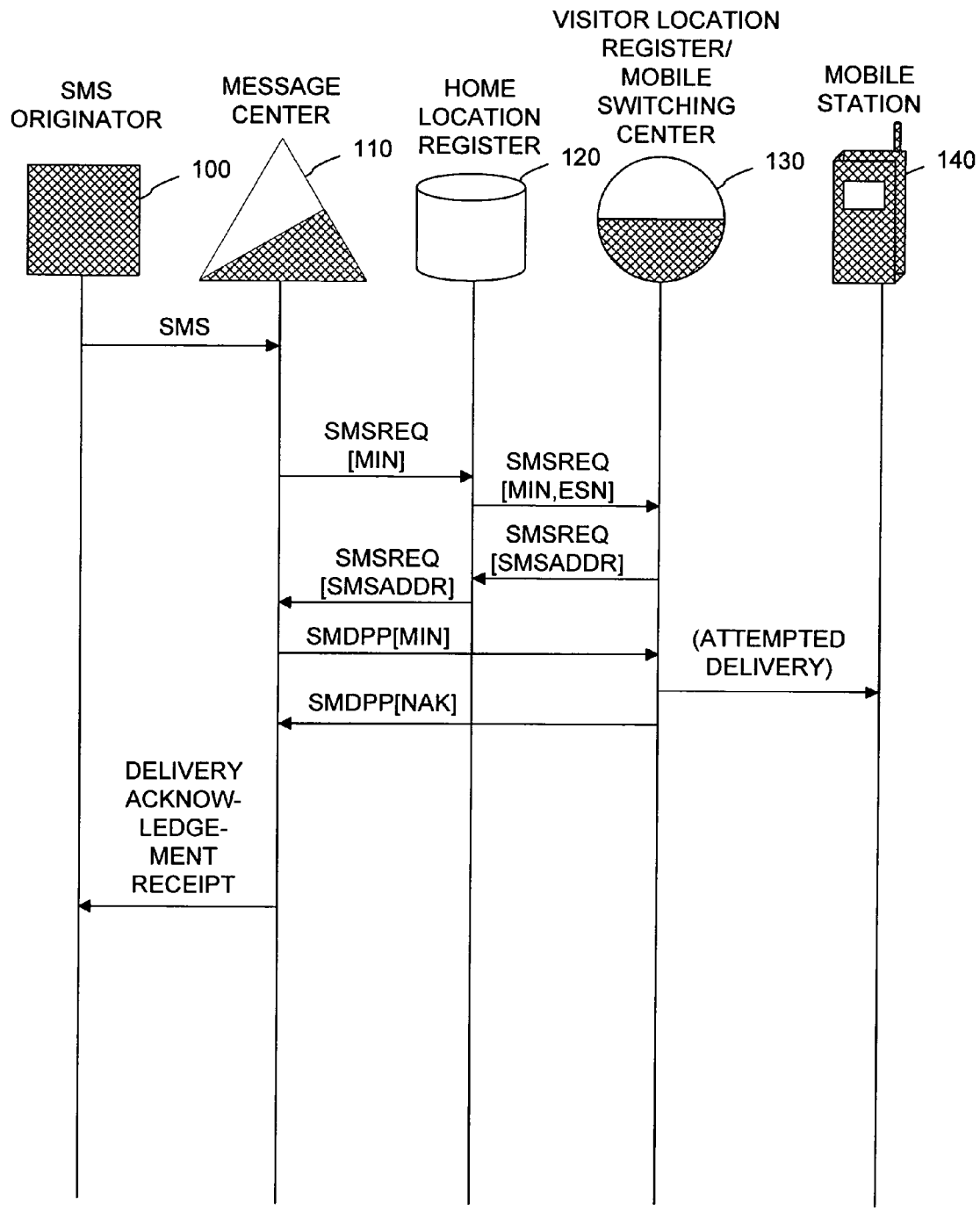

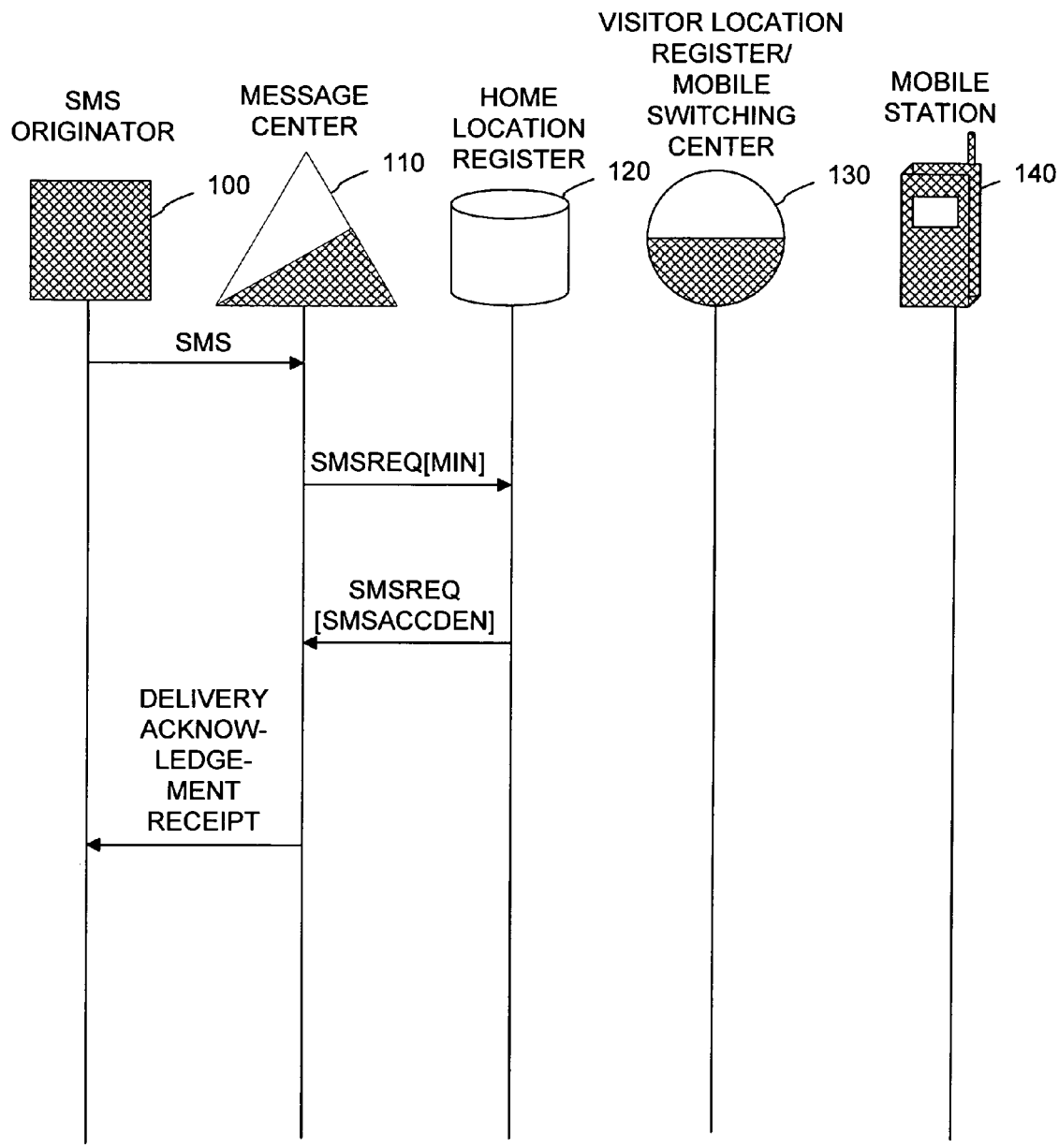

METHOD AND APPARATUS FOR NETWORK-ASSISTED AUTOMATIC CONFIRMATION OF SHORT MESSAGE SERVICE DELIVERY

RELATED APPLICATIONS

This application is a continuation of U.S. patent application Ser. No. 10/011,554, filed Nov. 6, 2001, published as US-2002-0119794-A1, now U.S. Pat. No. 6,928,290 which claims the benefit of U.S. Provisional Patent Application No. 60/325,788, filed Nov. 6, 2000, all of which are incorporated herein in their entirety.

FIELD

The present invention relates generally to short message service in mobile networks, and, more particularly to confirmation of short message service delivery in mobile networks.

BACKGROUND

Various mobile telecommunication standards include specifications for a subscriber service known in the art as short message service (SMS) (otherwise known as cellular message teleservice, text messaging, PCS messaging, and a variety of other names) which provides for the transmission of short text messages to a subscriber at her or his mobile terminal. For example, the existing IS-136 TDMA Standard describes a one-way messaging service that allows text of 180 characters or less to be sent by a short message service center (SMSC) to an IS-136 capable mobile phone. In the current implementation of the service, the originator of the text message receives no verification that the recipient's phone ever received the message.

Nevertheless, numerous technologies have been developed which allow for confirmation of whether a message has been delivered to a subscriber terminal. Existing services based on SMS fall into one of three categories: (1) There are two-way paging systems wherein the paging subscriber can initiate a manual response to a message, which often requires new devices or new interfaces on cell phones. (2) Some systems provide a unique confirmation number to each message and the sender can call the system later to track the delivery status of a message using the confirmation code. (3) There are enhanced protocols being proposed to enable advanced wireless information services including confirmed message delivery, an example being the ReFLEX system of MOTOROLA. However, such protocols are not in widespread use.

Accordingly, a network-assisted system that uses existing protocol standards, that does not require recipients to manually acknowledge receipt of each message, or that does not require the sender to repeatedly check message delivery status would be beneficial.

SUMMARY

An improved message verification technique based on currently-existing protocols, such as described in the above-mentioned IS-136 standard can be provided. Existing network signals that acknowledge receipt of a message can be captured and utilized to notify the originator when the SMS message is delivered.

In one embodiment, a short message service center either accesses a database of delivery acknowledgement preferences or parses a short message for encoded delivery acknowledgement preferences and, upon receipt of the relevant network message delivery signal, initiates a delivery acknowledgement back to the originator in accordance with the originator's preferences. The delivery acknowledgement can utilize any of a number of forms of communication infrastructures that can act as external short message entities to the short message service center, including, and without limitation, an e-mail gateway to the Internet, a paging system, a wireless application protocol proxy server, etc. The delivery acknowledgement preferences can express, for example, whether the sender wishes to have each SMS message acknowledged by default or on a message-by-message basis, what type of acknowledgement the sender desires, as well as to what particular address to send the acknowledgement.

Thus, message verification can be improved in certain embodiments in that a system can utilize existing protocols, need not require a sender to repeatedly check message delivery status, and need not require a recipient to explicitly acknowledge receipt of each message manually.

These and other advantages of certain embodiments will be apparent to those of ordinary skill in the art by reference to the following detailed description and the accompanying drawings.

BRIEF DESCRIPTION OF THE DRAWINGS

FIGS. 2A through 2D are signal diagrams illustrating network signals exchanged during a SMS message delivery attempt.

DETAILED DESCRIPTION

Figure 1:
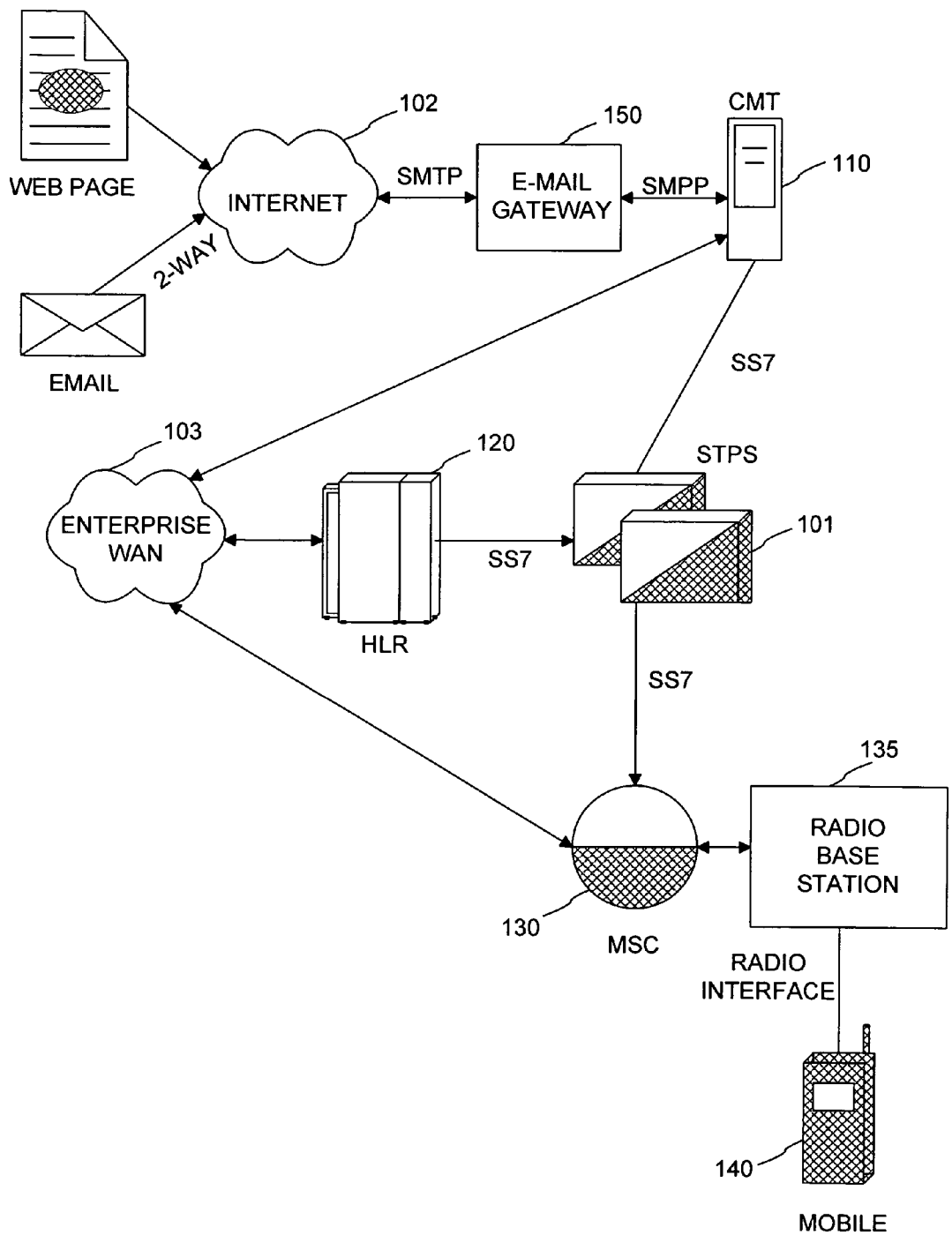
FIG. 1 sets forth an example of a short message service (SMS) system architecture used to illustrate a preferred embodiment of the present invention.

With reference to FIG. 1, an exemplary short message service (SMS) system architecture is shown to illustrate a preferred embodiment of the present invention. A short message service center (SMSC), exemplified in FIG. 1 as a cellular message teleservice (CMT) node 110, acts as an intermediary between a mobile network and one or more external short message entities. The CMT node 110 stores message service profiles detailing the preferences and subscription details of each subscriber with respect to messages for each of the mobile units which it services. The CMT node 110 uses a standard protocol such as Short Message Peer to Peer (SMPP) to communicate with any external short message entities, such as (and without limitation) a wireless application protocol (WAP) proxy server, an e-mail gateway or other type of messaging gateway, a voice processing system for handling voicemail alerts, a paging system, etc.

For example, FIG. 1 shows an e-mail gateway 150 connected to a standard packet-switched network 102, such as the Internet, where the gateway 150 is capable of initiating SMPP sessions with the CMT node 110. The CMT node 110 has been augmented to enable it to ascertain whether a delivery acknowledgement is desired—e.g., from data received during the SMPP session, from the content of the particular message, or from stored preferences of the originator of the message. For example, and without limitation, the preferences of the originator can be encoded in the message, as and the CMT node 110 could parse the message and, based on the content of the message, decide whether and how to send a delivery acknowledgement.

As is known in the art and as further described herein, the CMT node 110 has access to the mobile network and can ascertain where a mobile subscriber is roaming and transmit a short message to the subscriber's mobile unit 140. Thus, the CMT node 110 can contact elements of the mobile network, such as a home location register (HLR) 120 or a mobile service center (MSC) 130, using standard signaling, e.g. shown in FIG. 1 as an SS7 signaling network 101. The CMT node 110 can transmit a short message service request using a standard short message service protocol to the HLR 120 in order to determine where the subscriber is roaming. The HLR 120 receives the SMS request, consults subscriber data, and responds with a return result identifying the appropriate mobile switching center 130, e.g. by MSCID. Or the HLR 120 can return a result indicating that the subscriber's mobile 140 is inactive (e.g., powered down or outside of the coverage area) or that the subscriber's mobile is incapable of receiving SMS. If the subscriber is inactive, the CMT node 110 can keep the short message in queue for a set period while the HLR 120 keeps a flag that shows a message is waiting. Once the subscriber roams back to an MSC in the "home" area, the HLR 120 sends an SMS notification back to the CMT node 110 which can then attempt message delivery. The CMT node 110 can send a Short Message Delivery Point to Point (SMDPP) message to the relevant MSC 130 where the text of the short message is contained within the SMDPP message. The MSC 130 can, in turn, contact a base station 135 and have the particular mobile unit 140 paged using standard R-Data/SMS protocols, e.g. in accordance with the IS-136 TDMA standard in North America. If the mobile unit 140 responds, the system delivers the message to the mobile unit 140. If the message transmission is successful, a SMDPP return result goes from the MSC 130 back to the CMT node 110 which can set the status of the message to "sent" and will not attempt to send the message again.

This series of messages exchanged between the CMT node 110 and the mobile network (e.g. across standard ANSI/TIA/EIA-41 network interfaces) is illustrated in greater detail in FIGS. 2A through 2D. FIG. 2A shows the messages exchanged during a successful SMS delivery from a message center 110 to a registered and active mobile station 140. FIG. 2B shows the messages exchanged during a successful delivery of a pending SMS (e.g., where the message center 110 has stored the message and awaits the activation and registration of the mobile station 140). FIG. 2C shows the messages exchanged during an attempted SMS delivery to a registered mobile station 140 where there has been a delivery failure between the MSC 130 and the mobile station 140. FIG. 2D shows the messages exchanged during an attempted SMS delivery from a message center 110 to an inactive mobile station 140.

In accordance with a preferred embodiment of the present invention, the existing network signals—such as the SS7 smdpp[ACK] return result shown above in FIGS. 2A and 2B—are captured at the CMT node 110 and a delivery acknowledgement receipt generated for delivery to the originator 100 of the short message. The delivery acknowledgement receipt can constitute confirmation of the SMS delivery. Similarly, other signals such as a smdpp[NAK] signal in FIG. 2C can be recorded and an acknowledgement receipt generated indicating that a SMS delivery attempt had failed (e.g., because the mobile station 140 was inactive and not registered). The acknowledgement receipt can be generated and delivered in any of a number of ways, which advantageously can depend on the method the originator 100 used to request the short message service or on the express preferences of the originator 100.

For example, with reference to FIG. 1, where the originator 100 has sent an e-mail to the e-mail gateway 150 in order to generate the SMS delivery request at the CMT node 110, the CMT node 110 can parse the e-mail for the message originator's e-mail address, conventionally found in the e-mail's "to:" header field. The receipt of a smdpp[ACK] signal can be matched up with the originator's stored e-mail address and an e-mail notification reply automatically generated and sent through the e-mail gateway 150 to the originator's e-mail address.

As another example, the SMS message could have an identification number of the originator's pager encoded in the message, and the CMT node 110 can parse the number and initiate a page containing a delivery status code upon receipt of the relevant status signal. As another example, the SMS message could have the originator's mobile phone number encoded in the message, and the CMT node 110 could initiate its own SMS message back to the originator's mobile.

The originator of the SMS message can choose whether to have each SMS message acknowledged by default or on a message-by-message basis. For example, as mentioned above, the preference can be encoded in the body of the SMS message that can be deciphered by the server. The wireless service provider can choose to deliver or block such feedback.

The foregoing merely illustrates the principles of the invention. Thus, for example, although the invention is illustrated in the context of known mobile cellular architectures and particular short message service standards, those skilled in the art will be able to implement the invention in any of a variety of mobile architectures. It will thus be appreciated that those skilled in the art will be able to devise numerous arrangements that, although not explicitly shown or described herein, nevertheless embody the principles of the invention and are within its spirit and scope.

What is claimed is:

1. A method of operating a short message service center comprising:

receiving a short message service request from a sender;

determining delivery acknowledgement preferences of the sender wherein the sender's preferences comprise an acknowledgement type, a location to send an acknowledgement, or an indication of message-by-message acknowledgment;

transmitting through a wireless mobile network a short message to a wireless mobile unit in accordance with the short message service request;

receiving a signal from the wireless mobile network acknowledging delivery of the short message to the wireless mobile unit; and transmitting a delivery acknowledgement in accordance with the delivery acknowledgement preferences of the sender;

wherein the delivery acknowledgement preferences of the sender comprise at least:

an encoding in a message received, or a database of delivery acknowledgement preferences.

2. The method of claim 1 wherein the delivery acknowledgement preference is stored in the database.

3. The method of claim 1 wherein the delivery acknowledgement preference is encoded in the short message service request.

4. The method of claim 1 wherein the delivery acknowledgement is an e-mail transmitted to the sender's e-mail address.

5. The method of claim 1 wherein the delivery acknowledgement is transmitted using a short message service.

6. The method of claim 1 wherein the delivery acknowledgement is a page in a paging system.

7. The method of claim 1 wherein the delivery acknowledgement is transmitted to a wireless application protocol proxy server.

8. A short message service center comprising:
a first interface to a wireless mobile network;
a second interface to an external short message entity;
a central processing unit connected to the first and second interfaces for executing computer program instructions, the computer program instructions causing the central processing unit to perform the following:
receiving a short message service request from a sender;
determining delivery acknowledgement preferences of the sender wherein the sender's preference comprises an acknowledgement type, a location to send an acknowledgement, or an indication of message-by-message acknowledgment;
transmitting through the wireless mobile network a short message to a wireless mobile unit in accordance with the short message service request;
receiving a signal from the wireless mobile network acknowledging delivery of the short message to the wireless mobile unit; and
transmitting through the external short message entity a delivery acknowledgement in accordance with the delivery acknowledgement preferences of the sender;
wherein the delivery acknowledgement preferences of the sender comprise at least:
an encoding in a message received, or
a database of delivery acknowledgement preferences.

9. The short message service center of claim 8 wherein the external short message entity is an e-mail gateway and the delivery acknowledgement is an e-mail transmitted to the sender's e-mail address.

10. The short message service center of claim 8 wherein the external short message entity is a paging system and the delivery acknowledgement is a page in the paging system.

11. The short message service center of claim 8 wherein the external short message entity is a wireless application protocol proxy server.

12. A wireless network node configured to communicate with at least one wireless mobile communication device, the wireless network node comprising:
a processor configured to perform at least the following:
receiving a short message service request from a sender;
determining delivery acknowledgement preferences of the sender wherein the sender's preference comprises an acknowledgement type, a location to send an acknowledgement, or an indication of message-by-message acknowledgment;
receiving an SMDPP acknowledgement message as a result of attempting communications with the wireless mobile communication device; and
responsive to receiving the SMDPP acknowledgement message, transmitting a delivery acknowledgement receipt to the sender, according to the determined delivery acknowledgement preferences of the sender;
wherein the delivery acknowledgement preferences of the sender comprise at least:
an encoding in a message received, or
a database of delivery acknowledgement preferences.

13. The wireless network node of claim 12 wherein the SMDPP acknowledgement message indicates an acknowledgement status related to the wireless mobile communication device.

14. The wireless network node of claim 12 wherein the wireless network node is further configured to communicate with at least one short message entity, the processor further configured to perform at least the following:
receiving an SMS message from the short message entity;
transmitting an SMDPP message addressed to the wireless mobile communication device;
wherein the SMDPP acknowledgement received acknowledges transmission of the SMDPP message addressed to the wireless mobile communication device.

15. The wireless network of claim 14, wherein the processor is further configured to perform at least the following:
associating an email address with the SMS message; and
transmitting, in the transmitting step,
an indication of the delivery acknowledgement receipt to the email address.

16. The wireless network node of claim 15 wherein the delivery acknowledgement receipt is sent to a pre-specified destination.

17. The wireless network node of claim 16 wherein the pre-specified destination is stored as destination preferences adapted to be modified by a user of the short message entity.

18. The wireless network of claim 12 wherein the SMDPP acknowledgement message indicates unsuccessful communication with the wireless mobile communication device.

19. The wireless network of claim 12 wherein the SMDPP acknowledgement message indicates the wireless mobile communication device is inactive.

20. The wireless network of claim 12 wherein the SMDPP acknowledgement message indicates the wireless mobile communication device is not adapted to receive SMS.

* * * * *